Fig.1

United States Patent Office 3,206,598
Patented Sept. 14, 1965

3,206,598
EVACUATED AND COOLED DIFFRACTION
CHAMBER FOR ELECTRON DIFFRACTION
APPARATUS
Lienhard Wegmann, Wallisellen, Zurich, Switzerland,
assignor to Trub, Tauber & Co., A.G., Zurich,
Switzerland
Filed Mar. 19, 1962, Ser. No. 180,678
Claims priority, application Switzerland, Mar. 20, 1961,
3,317/61
7 Claims. (Cl. 250—49.5)

This invention relates to an apparatus for recording electron diffraction diagrams having an electron diffraction apparatus containing a diffraction chamber.

Electron diffraction apparatus for investigating crystal structure of thin layers by transmission diffraction or of surface layers by reflection are known. The following methods of influencing the specimen are for example also known: cooling and heating the specimen, coating of the surface for the application and formation of surface layers; ion etching for the removal of surface layers; irradiation with slow slectrons or preventing or removing charges; cooling traps for eliminating the influence of vapors and gases.

The avoiding of the last-mentioned influence is very important particularly in the case of the diffraction of electrons on surfaces of readily oxidisable metals, since even very low partial pressures of oxygen are sufficient for the thin surface layer of the order of magnitude of 50 A., which contributes towards the diffraction obtained by reflected electrons, to be entirely or partially oxidised, so that diffraction on pure unoxidised metal becomes impossible. The oxidation problem becomes even more urgent in the case of coating application and of ion etching, since in both cases oxygen molecules may also be incorporated in the surface structure. Other gas and vapor reactions also result in undesirable influence on the surface observed, for example nitration or sulphuration.

A known method of avoiding such undesirable reactions is to employ a vacuum of the order of magnitude of $10^{-8}$ to $10^{-9}$ mm. of Hg. This has been achieved for example in a glass apparatus which is opened and closed by melting for the purpose of changing the specimen. In order to be able to evacuate the apparatus to the high vacuum, the usual movable vacuum connections had to be dispensed with, although this very considerably restricts the versatility of the apparatus. It is for example certainly possible to apply by evaporation a coating of a metal sensitive to oxidation after the high vacuum has been attained, and with the aid of the electron diffraction to prove that this coating is free from oxide, but it is impossible to obtain on a metal piece an oxide-free surface of the same metal, since the oxide skin present on the introduction of the piece into the apparatus would have to be etched away after the vacuum had been reached, which is possible only by ion etching. The installing of an ion etching device would however impair the vacuum by several powers of ten, so that oxidation would occur once again.

The present invention describes an electron diffraction apparatus in which the known devices for influencing the specimen, particularly ion etching, can be used, while however steps are taken to influence the immediate environment of the specimen in such a manner that gas reactions, particularly oxidations, are entirely or at least largely avoided. The steps to be taken according to the invention are based on the fact discovered by experiment that the speed of reaction of the object with the gas is greatly reduced if the object is surrounded on all sides by cooled walls at a distance which is substantially smaller than the free path length of the molecules in the residual gas. In order to obtain the same retardation of the reaction as in the above-mentioned glass apparatus with a vacuum of $10^{-8}$ to $10^{-9}$ mm. of Hg, the interior space surrounded by the aforesaid cooled walls must be evacuated to a vacuum of only $10^{-6}$ to $10^{-7}$ mm. of Hg. This vacuum can be achieved in metal apparatus, provided that there are not too many lead-ins and other structural elements unfavorable to vacuum technique. This is however precisely the case with the electron diffraction apparatus, since all means of moving and influencing the specimen are fitted in the proximity of the specimen.

In order nevertheless to obtain the necessary vacuum at the site of the specimen, the inner chamber surrounded by cooled walls is evacuated according to the invention with the aid of a separate or additional vacuum plant.

The apparatus according to the invention for recording electron diffraction diagrams is characterised in that the diffraction chamber contains an inner object chamber which completely surrounds the object with the exception of the apertures necessary for measurements, observations, and treatments, that the walls of the aforesaid inner object chamber are cooled, and that at least one additional vacuum pump is provided for separately evacuating the inner object chamber.

In the accompanying drawings:

FIGURE 8 shows a section through the diffraction chamber of a fourth example of construction of the electron diffraction apparatus according to the invention and through a part of the supplementary equipment flanged thereon.

Figure 1:
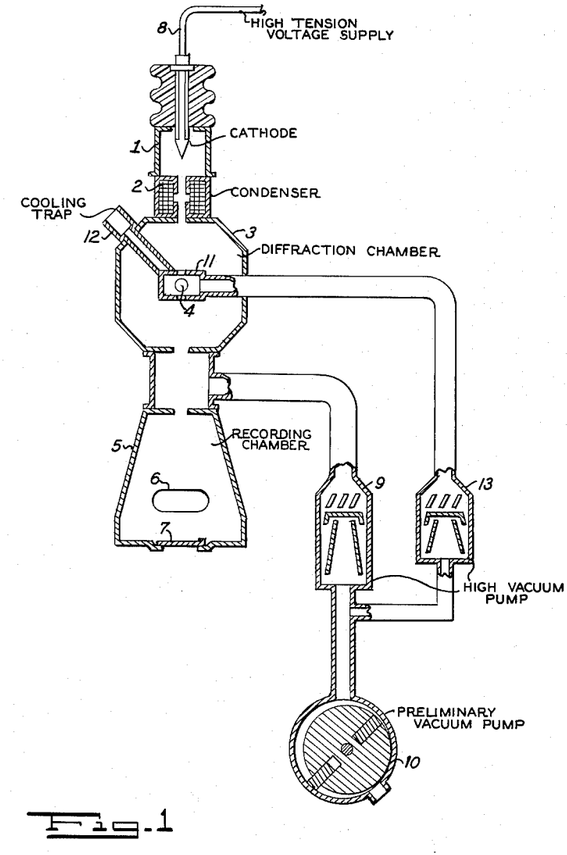
FIG. 1 shows some essential parts of the embodiments of the invention given by way of example and described more fully hereinbelow.

The electron diffraction apparatus illustrated diagrammatically in FIGURE 1 has the following main parts:

A cathode part 1 with the necessary apparatus, a condenser part 2 with one or more lenses, a diffraction chamber 3 with the specimen 4 to be examined, a recording chamber 5 with observation windows 6 and fluorescent screen or photographic apparatus 7, a high voltage supply cable 8 to the cathode, a high vacuum pump 9, and a preliminary vacuum pump 10 which together constitute the main vacuum plant used for evacuating the diffraction apparatus and which in principal can be composed of any desired number of pumps; an inner object chamber 11 contained in the diffraction chamber 3 and surrounding the specimen 4; a cooling trap 12 which contains a cooling medium which is in contact direct or through good heat conductors with the walls of the inner chamber 11, and an additional high vacuum pump 13 which on its high vacuum side separately evacuates the inner chamber 11 and on the pre-vacuum side is either connected to the main vacuum plant or has its own preliminary pumps.

The necessary apertures of the inner chamber 11 are indicated in FIGURE 1 as being only two in number: the aperture for the connection of the pump pipe on the right and the apertures for the inlet and outlet of the diffracting electron beam at top and bottom. These are supplemented by further apertures as required: the means of securing the specimen on a goniometer head or the separate heating or cooling of the specimen require a lead-in which is not in heat conducting contact with the cooled walls; the bombardment of the specimen with ions for etching, with electrons for discharge, and with molecules for coating require further apertures. With the exception of the evacuation pipe, each of these apertures forms a leak for the evacuation of the inner chamber 11, the effect of which can be measured through a vacuum resistance W$i$. A vacuum resistance W$p$ can also be associated with the evacuation pipe. In order that a higher vacuum may now be obtained in the inner chamber than in the diffraction chamber, the $i$ apertures in the inner chamber must be so designed that $\Sigma Wi > Wp$. Expressed in words, the sum of the vacuum resistances of the individual apertures of the inner chamber is greater than the vacuum resistance of the suction pipe of the inner chamber.

In the case of some apertures it will be necessary to provide shutters or vacuum shutters in order to increase the vacuum resistance; a part of the aperture may also be closed again by the supplementary devices as required. Uncooled surfaces in the apertures may thus form a boundary of the inner chamber. These uncooled surfaces are likewise included among the apertures; they do not however contribute towards the vacuum resistances to be taken into account. In order however not to endanger the effectiveness of the apparatus, the total area of the apertures (excluding the suction pipe) must not amount to more than one fifth of the total cooling surfaces.

Figure 2:
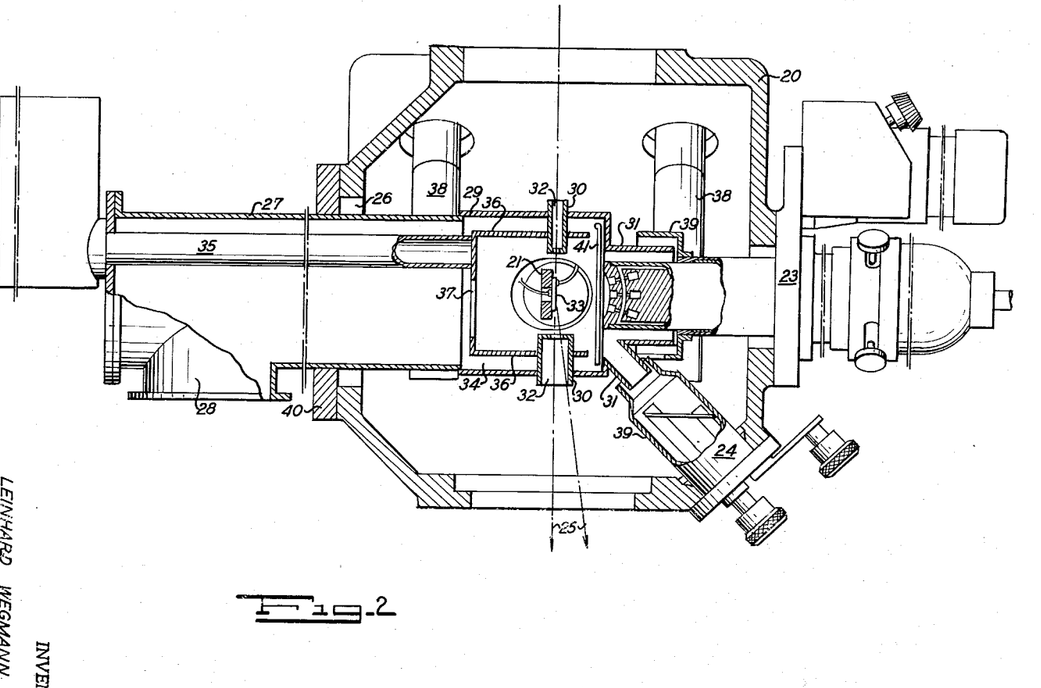
FIGURE 2 shows a section through the diffraction chamber of a first example of construction of the electron diffraction apparatus according to the invention and through a part of the supplementary equipment flanged thereon, on a larger scale.
Figure 3:
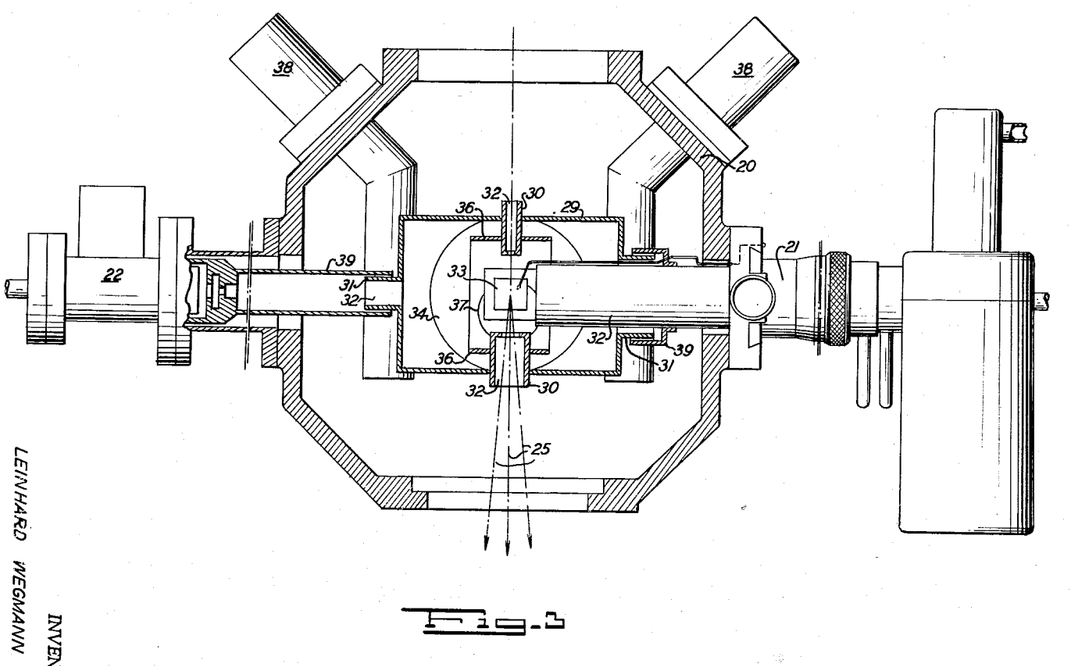
FIGURE 3 shows a section through the same diffraction chamber, at right angles to the section in FIGURE 2, and likewise through a part of the supplementary equipment flanged thereon.

In the first embodiment illustrated by way of example in FIGURES 2 and 3, an object holder 21, a discharge device 22, an ion etching device 23, and an evaporating device 24 are flanged on a diffraction chamber 20 corresponding to the diffraction chamber 3, in such a manner that they do not hinder the effectiveness of one another and do not cut off the diffracted electron beams 25 which are to be recorded and which are diagrammatically illustrated in FIGURES 2 and 3. Through the supplementary aperture 26 a vacuum pipe 27 is taken out of the diffraction chamber 20 in a vacuum-tight manner, the aforesaid separate high vacuum pump 13 being flanged onto the flange 28 of the said vacuum pipe. The inner chamber 29 corresponding to the inner chamber 11 has apertures 32 which are provided with vacuum shutters 30 and 31 respectively, and by which the electron, ion, and molecular beams can reach the object 33 illustrated diagrammatically. These vacuum shutters 30 and 31 are so constructed that the effectiveness of the supplementary devices is not hindered, and that at the same time the resulting flow resistance (see M. Von Ardenne, Tabellen der Elektronenphysik, Ionenphysik und Uebermikroskopie, Deutscher Verlag der Wissenchaften, Berlin 1956, pages 674–678), of all resulting residual gas passages of the inner chamber 29 is great in relation to the flow resistance of the vacuum pipe 27. This permits the production of an improved vacuum in the inner chamber 34. A cooling trap 35 is flanged onto the vacuum pipe 27 and provided with heat conducting plates 36 which act as cooling surfaces situated in the environment of the object. These plates 36 must be disposed in such a manner that they do not hinder the effectiveness of the supplementary devices and do not act as vacuum shutters to close the vacuum pipe 27. For example, the plate system can for this purpose be provided with an aperture 37.

A further increase of the vacuum in the inner chamber 29 is achieved if the supplementary devices are likewise provided with vacuum shutters 39, since thereby the conductivity of the flow resistance of the apertures 32 can be reduced without hindering the effectiveness of the supplementary devices. Still higher vacuums are obtained if, in addition, the inner chamber 29 and the vacuum pipe 27 are so constructed that they can be heated. An improvement of the vacuum in the inner chamber is further achieved by means of a shutter 41 which is disposed inside the inner chamber near the aperture 32 but without touching the inner chamber 29. It can be operated by an electrically conducting drive not illustrated in FIGURES 2 and 3, and which is taken out of the inner chamber 29 and out of the diffraction chamber 20 with electrical insulation through an aperture provided with a vacuum shutter. This shutter 41 can be used to cover the coating apparatus 24, for controlling the ion beam of the ion etching device 23, and for covering the aperture 32 in a vacuum-tight manner. It is particularly to be stressed that in this first embodiment a coating apparatus, an ion etching apparatus, and a discharge apparatus can be fitted in the diffraction chamber one after the other or simultaneously as preferred, so that they can act on the object situated in the inner object chamber.

Figure 4:
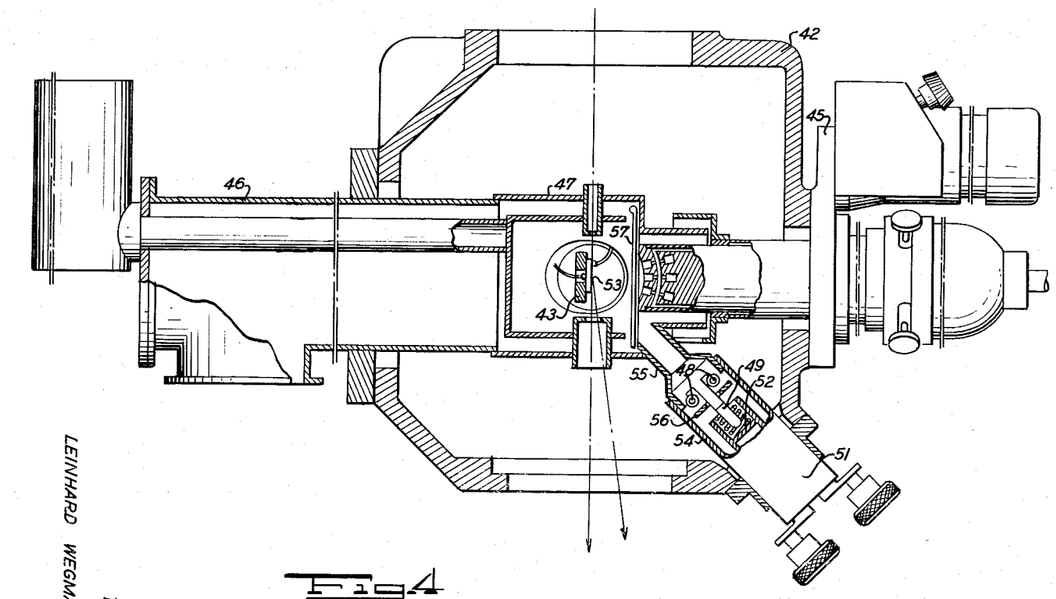
FIGURE 4 shows a section through the diffraction chamber of a second example of construction of the electron diffraction apparatus according to the invention and through a part of the supplementary equipment flanged thereon.
Figure 5:
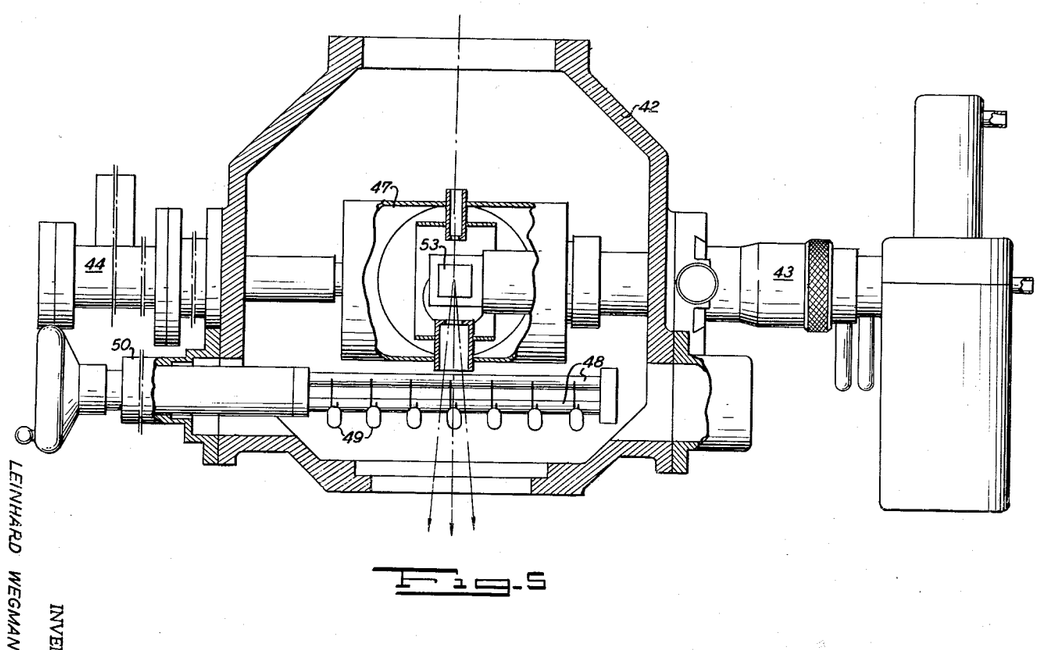
FIGURE 5 shows a section through the same diffraction chamber, at right angles to the section in FIGURE 4, in a plane in front of the object and likewise through a part of the supplementary equipment flanged thereon.

A second embodiment which permits a larger number of dosed coatings of one or more substances with reproducible angles of incidence is illustrated in FIGURES 4 and 5.

An object holder 43, a discharge device 44, an ion etching device 45, and a vacuum pipe 46 with an inner chamber 47 provided with vacuum shutters of low conductivity of the flow resistance and with cooling surfaces are flanged onto a diffraction chamber 42, in such a manner, as in the case of the arrangement illustrated in connection with the first embodiment, that they do not hinder the effectiveness of one another. On a carrying device 48 which does not hinder the effectiveness of the abovementioned supplementary devices, a plurality of substance carriers 49, illustrated diagrammatically, are suspended with thermal insulation and serve to receive the substances to be applied by evaporation. The carrying device 48 is mounted on a drive 50 which serves to move the substance carriers 49. A heating device 51, which likewise does not hinder the effectiveness of the abovementioned supplementary devices, is flanged onto the diffraction chamber 42 and can be moved under vacuum in such a manner that the diagrammatically illustrated heating oven 52 can be pushed over a freely selectable substance carrier 49 (as illustrated in FIGURE 4) or drawn back away from the same. The selectable heating of the individual substance carriers 49 is thus ensured. Reproductivity of the evaporation angle can be obtained inasmuch as the molten substance to be applied by evaporation and contained in a substance carrier can be brought by means of the drive 50 into a defined reproducible position in relation to the object 53.

The following parts are advantageous in this exemplified embodiment: The cylinder 54 which is provided with vacuum shutters and which reduces the conductivity of the flow resistance of the vacuum shutter 55; the shutters 56 on the carrying device 48 which serve to reduce the coating of the inner chamber and of the vacuum shutter 55; the shutter 57 for covering the object 53 before coating and for controlling the ion beam of the ion etching device 45.

It should be stressed that in the second embodiment the coating device contains a plurality of substance carriers which contain the substances to be applied by evaporation, while the individual substance carriers can be brought into the same position in relation to the object in any desired sequence and time succession.

The arrangements illustrated in connection with the embodiments described so far did not contain a device for introducing and removing the object. For the purpose of changing the object these arrangements must be exposed to the atmosphere, so that the surfaces in the diffraction chamber, for example those of the aforesaid inner chamber are subjected to gas adsorptions. In addition, there are electron diffraction investigations in which the object holder shown in FIGURES 1 to 5 has to be replaced by another object holder (not illustrated) of an intrinsically known type, without a large part of the diffraction chamber and of the supplementary devices flanged onto the same having to be exposed to the atmosphere.

Figure 6:
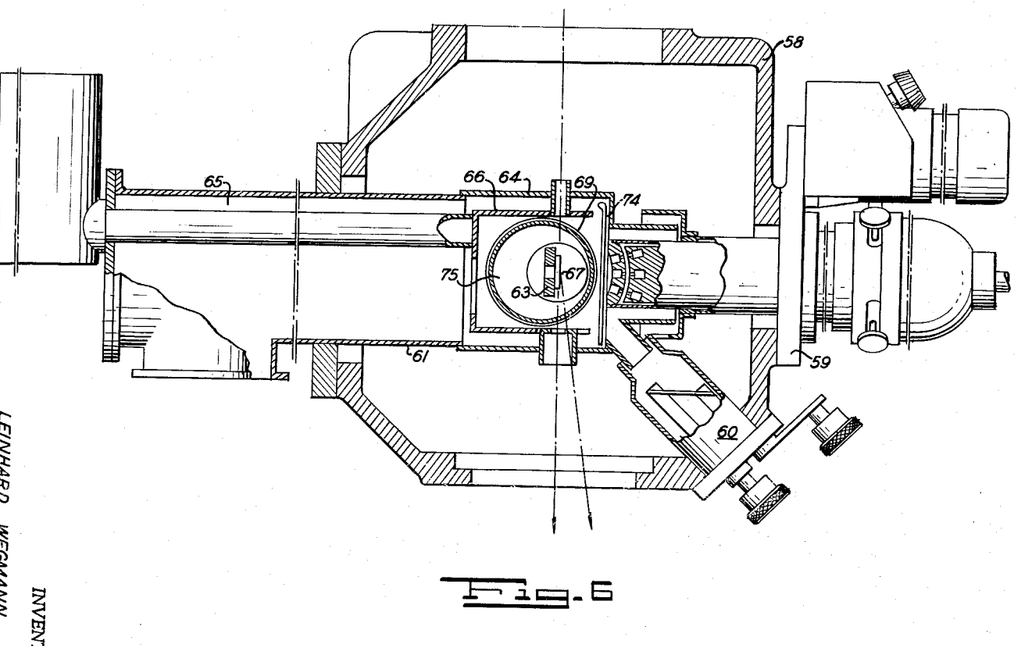
FIGURE 6 shows a section through the diffraction chamber of a third example of construction of the electron diffraction apparatus according to the invention and through a part of the supplementary equipment flanged thereon.
Figure 7:
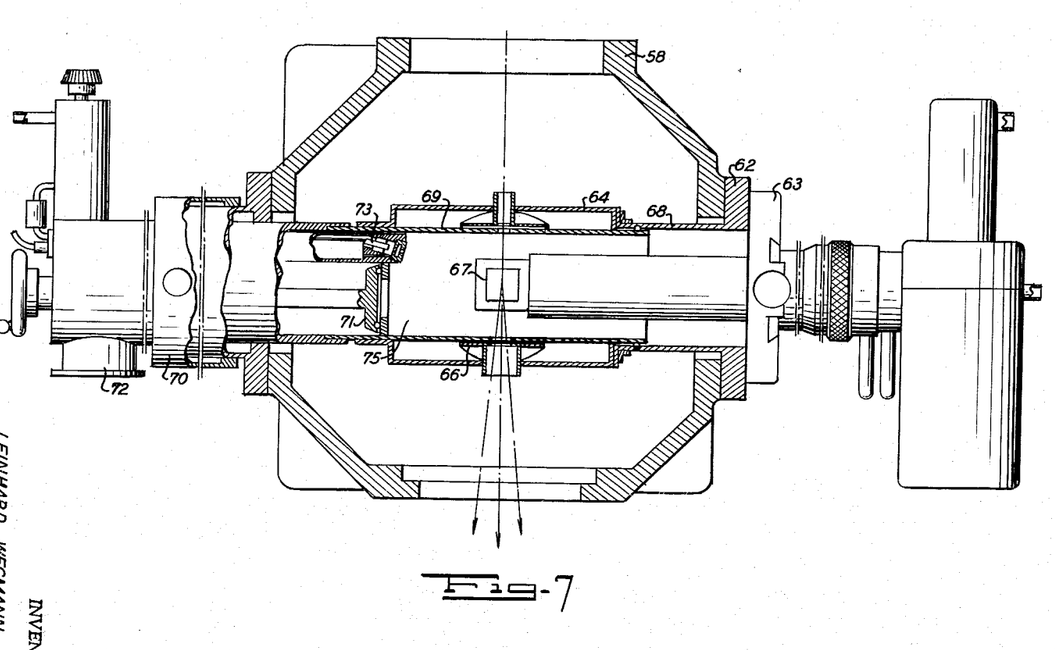
FIGURE 7 shows a section through the same diffraction chamber at right angles to the section in FIGURE 6, and likewise through a part of the supplementary equipment flanged thereon.

A third example of construction of the apparatus in question, which permits the replacement of the object and of the object holder, is illustrated in FIGURES 6 and 7.

An ion etching device 59, a coating device 60, a vacuum pipe 61, and (through an intermediate flange 62) an object holder 63 are flanged onto a diffraction chamber 58. An inner chamber 64 provided with vacuum shutters is connected to the vacuum pipe 61. A cooling trap 65 is flanged onto the vacuum pipe 61 and is provided with cooling surfaces 66. An air-lock for the object holder 63 and/or for the object 67 and illustrated in the closed position in FIGURES 6 and 7, consists of the following parts: a fixed tube 68 mounted on the intermediate flange 62, a movable tube 69 which is drawn back by the drive 70 for the purpose of opening the air-lock and which can be closed in relation to the vacuum connection 72 by means of a plate valve 71. The apparatus of intrinsically known type needed for evacuating the air-lock chamber is not illustrated in FIGURES 6 and 7. A discharge device 73 is disposed inside the air-lock. The gas inlet valve of this discharge device can be used simultaneously for venting the air-lock. The arrangement of this air-lock is such that the freedom of movement of the object holder 63 and the effectiveness of the other supplementary devices mentioned are not hindered. The operation of the control shutter 74 corresponds to that of shutter 41 in FIGURE 2.

In the apparatus illustrated in FIGURES 6 and 7, the coating apparatus described in connection with the third embodiment and illustrated in FIGURES 4 and 5 can be provided instead of the coating apparatus illustrated in FIGURES 6 and 7 without hindering the other supplementary devices mentioned.

As an alternative, the air-lock can be constructed as a gas air-lock for carrying out reactions between the object and most corrosive gases, those portions of the air-lock and of the object holder which bound the space controlled by the air-lock, are made of material which is resistant to most gases.

The apparatus according to the third embodiment is particularly distinguished by the fact that the entire inner chamber is constructed as an air-lock so that the specimen can be removed from the inner chamber and diffraction chamber without breaking the vacuum in the inner chamber and diffraction chamber.

In a modified embodiment, the apparatus is characterized by the fact that the air-lock is constructed as a container for corrosive gases.

A fourth example of construction of the apparatus according to the invention permits desirably the reproducible light-optical observation of the object surface without the vacuum conditions having to be interrupted and without the effectiveness of the supplementary devices mentioned being hindered.

Figure 9:
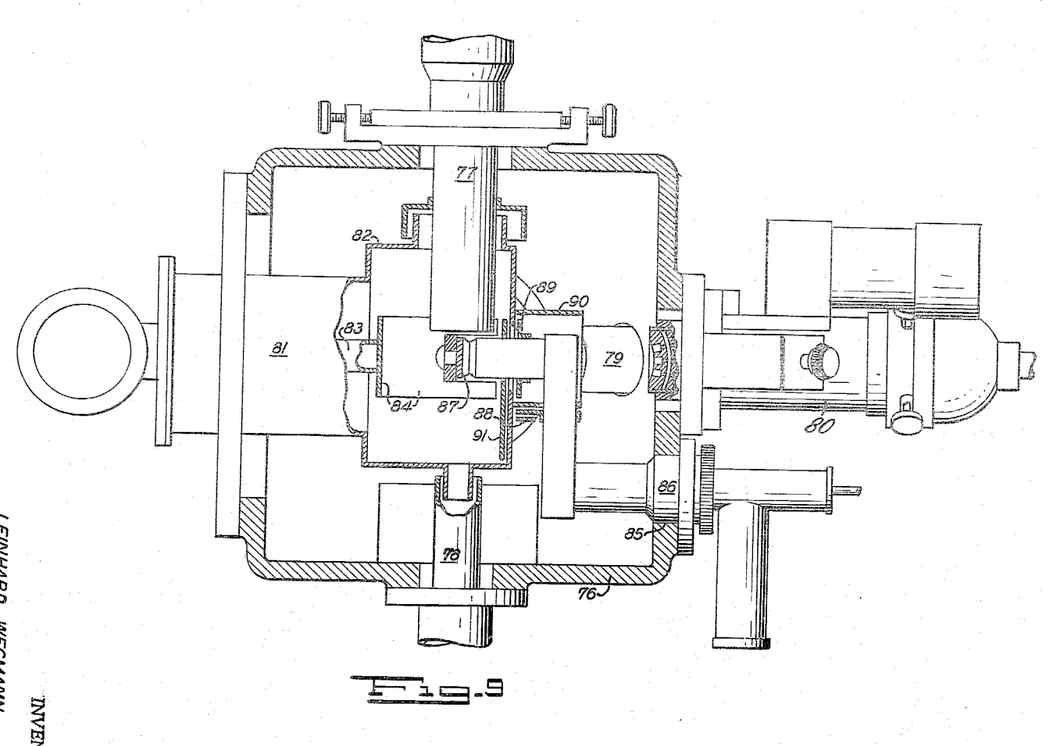
FIGURE 9 shows a section through the same diffraction chamber at right angles to the section in FIGURE 8, and likewise through a part of the supplementary equipment flanged thereon.

An object holder 77, a discharge device 78, a coating device 79, an ion etching device 80, and a vacuum pipe 81 with an inner chamber 82 provided with vacuum shutters are flanged onto a diffraction chamber 76. A cooling trap 83 is flanged onto the vacuum pipe 81 and provided with cooling plates 84. The arrangement of the supplementary devices is such that their effectiveness is not hindered. The portions of the ion etching device 80 projecting into the diffraction chamber 76 can be drawn back in the manner illustrated in FIGURES 8 and 9. The diffraction chamber 76 now has for example in addition to the ion etching device 60 an additional aperture 85 to which a device 86 for the light-optical observation of the object surface 87 can be flanged. The bent-over portions of this device 86 which project into the diffraction chamber 76 are provided with vacuum shutters 88, which can be drawn back under vacuum out of the working position illustrated in FIGURES 8 and 9 and swung upwards so that the ion etching device 80 can be pushed back into its working position. The aforesaid vacuum conditions can be obtained without interruption owing to the fact that the aforesaid conductivity of the flow resistance of the aperture in the inner chamber 82 can be kept low through the vacuum shutter 90 or through the vacuum shutters 90 and 88 and through the slidable shutter 91, without interruption. As in the case of the covering and control shutter described in connection with the first embodiment, the shutter 91 can be moved by means of a drive not illustrated in FIGURES 8 and 9.

The apparatus illustrated in the fourth embodiment is characterized particularly in that in addition to the other devices a pivoting device can be fitted for the light-optical observation of the object to be examined.

Figure 10:
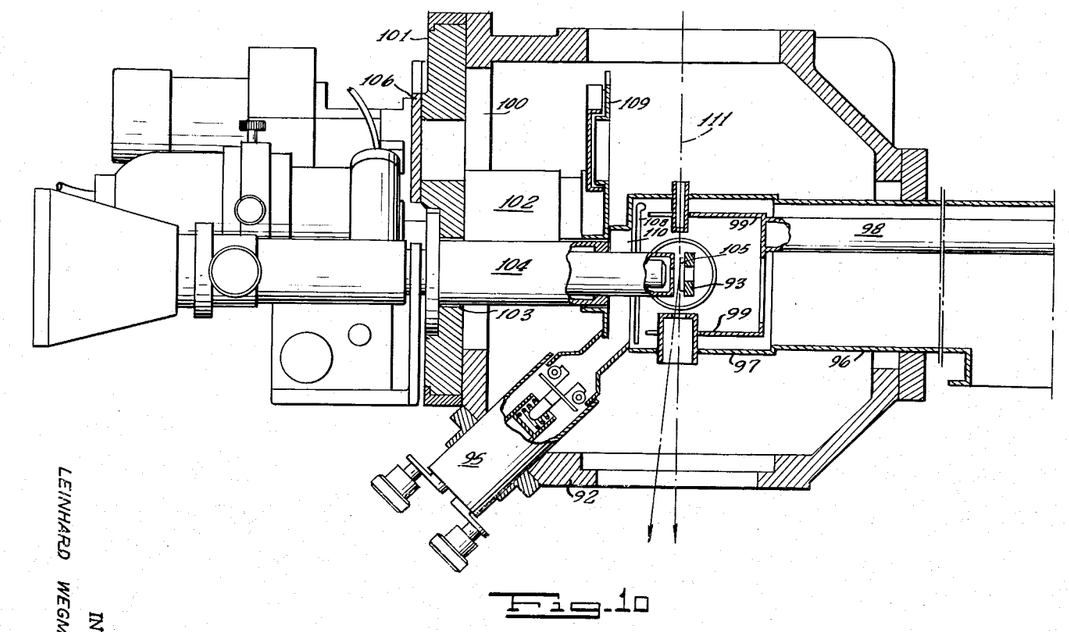
FIGURE 10 shows a section through the diffraction chamber of a fifth example of construction of the electron diffraction apparatus according to the invention and through a part of the supplementary equipment flanged thereon.
Figure 11:
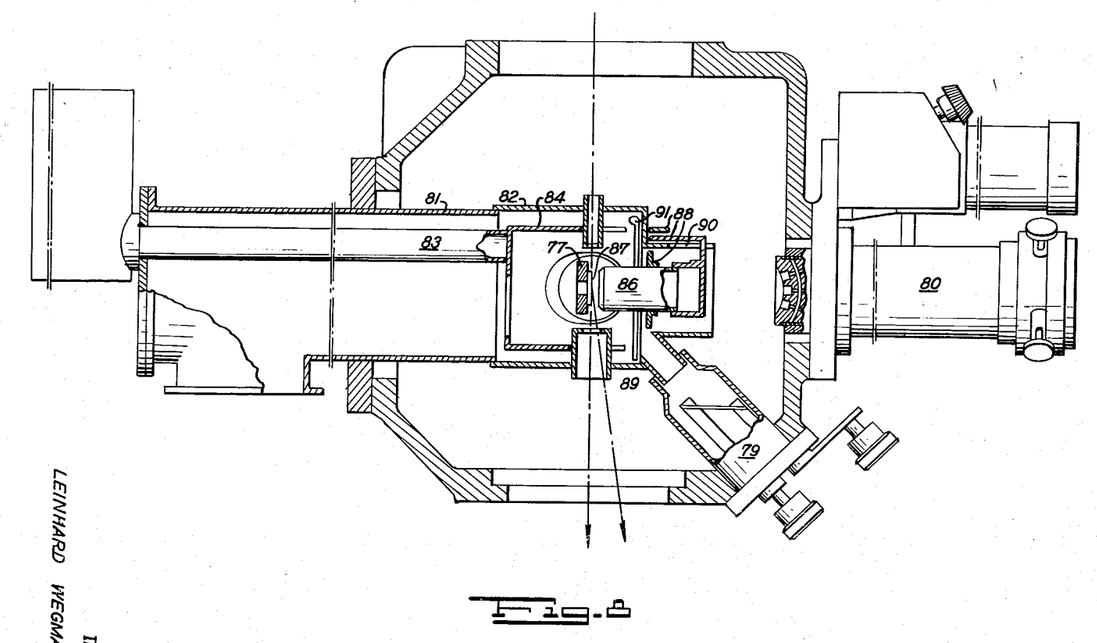
FIGURE 11 shows an elevation of a turret head of the same diffraction chamber and a part of the supplementary equipment flanged thereon.

A fifth example of construction of the apparatus according to the invention, which in addition to the above-mentioned ion etching, enables a number of desirable supplementary devices to be brought as required into their working position in front of the object, without hindering the arrangement and effectiveness of the necessary supplementary devices and without interrupting the vacuum conditions is illustrated in FIGURES 10 and 11.

An object holder 93, a discharge device 94, a coating device 95, and a vacuum pipe 96 with an inner chamber 97 provided with vacuum shutters are flanged onto a diffraction chamber 92. A cooling trap 98 is flanged onto the vacuum pipe 96 and provided with cooling plates 99. The arrangement of the supplementary devices is such that their effectiveness is not hindered and that space remains for other supplemntary devices. A turret head 101 which can be rotated under vacuum and which has a plurality of apertures is mounted on an additional large aperture 100 in the diffraction chamber 92. An ion etching device 102 is flanged onto one of the apertures and to the aperture 103 a device 104 for the light-optical observation of the object surface 105 is flanged. Other devices, not illustrated in FIGURES 10 and 11, can be flanged onto the apertures which in FIGURES 10 and 11 are closed blank flanges 106, for example for visual observation, for measurement of temperature, and for the mechanical polishing of the surface of the object. The devices which are flanged on the turret head 101 must be drawn back under vacuum out of their working position. In order that the aforesaid vacuum conditions may also be maintained during the rotation of the turret head 101, a shutter 108, slidable with the aid of the drive 107, is mounted inside the inner chamber 97 and a vacuum shutter 109 is fastened to the turret head 101 in such a manner that the aperture 110 in the inner chamber 97 can be closed to form a vacuum shutter in every position of the turrent head 101.

The apparatus illustrated in connection with the fifth embodiment is particularly characterized by the fact that the apparatus for the light-optical observation together with one or more of the other devices, is mounted on a pivoting mechanism in such a manner that the devices can be alternately brought in front of the object.

What is claimed is:

1. In apparatus for recording electron diffraction patterns, the combination comprising a vacuum tube having cathode and condenser means, vacuum pump means for evacuating said vacuum tube, said vacuum tube including a diffraction chamber and a recording chamber, an inner chamber disposed within said diffraction chamber and having chamber walls adapted to surround a specimen to be examined, cooling means for cooling said inner chamber, means defining a pair of aligned openings in said inner chamber walls for the passage of a diffracting and diffracted electron beam, means defining a plurality of apertures in said inner chamber walls, a specimen holder disposed in one of said apertures, a discharging electron beam device disposed in another of said apertures, an ion beam device disposed in another one of said apertures, a molecular beam device disposed in a further one of said apertures, said pair of openings and said plurality of apertures being arranged relative to each other so that they are directed toward a specimen on said specimen holder, said specimen holder being disposed in non-heat transfer relationship with said inner chamber walls, and second vacuum pump means operatively connected to said inner chamber whereby said inner chamber is evacuated to a higher vacuum than said diffraction chamber.

2. In apparatus for recording electron diffraction patterns, the combination comprising a vacuum tube, vacuum pump means for evacuating said tube, electron optical elements in said tube for producing and focusing an electron beam, recording elements in said tube for recording diffracted electron patterns, said tube including a diffraction chamber, wall means disposed in said diffraction chamber defining an inner chamber therein and adapted to surround a specimen to be examined, cooling means for cooling said wall means, a specimen holder carried by said tube and extending through said diffraction chamber and said wall means into said inner chamber, said wall means including aperture means whereby said electron beam together with an ion beam from an ion etching device and a molecular beam from a coating device are directed toward a specimen on said specimen holder, second vacuum pump means operatively connected to said inner chamber for evacuating the same at a different rate than that at which said tube is evacuated by the first mentioned vacuum pump means, and means thermally insulating said specimen holder from said wall means whereby a specimen may be maintained at temperatures different from the temperature of the cooled wall means.

3. In apparatus for recording electron diffraction patterns, the combination comprising a vacuum housing, vacuum pump means for evacuating said housing, electron optical elements for producing and focusing an electron beam in said housing, recording elements for recording diffracted electron patterns, said housing including a diffraction chamber, wall means disposed in said diffraction chamber defining an inner chamber for a specimen to be examined, a specimen holder for holding a specimen to be examined in said inner chamber, cooling means for cooling said wall means, said housing and said wall means having a plurality of apertures, one pair each for said specimen holder, for an ion etching device, for a discharging device and for a coating device, said apertures being arranged so as to be directed toward a specimen to be examined in said inner chamber, means thermally insulating said specimen holder from said wall means, a separate evacuation pipe communicating with said inner chamber, and second vacuum pump means operatively connected to said pipe for evacuating said inner chamber, said apertures in said wall means having a greater sum of vacuum resistances than said evacuation pipe for said inner chamber.

4. In apparatus for recording electron diffraction patterns, the combination comprising a vacuum housing, vacuum pump means for evacuating said housing, electron optical elements for producing and focusing an electron beam in said housing, recording elements for recording diffracted electron patterns in said housing, said housing including a diffraction chamber, wall means in said chamber defining an inner chamber therein adapted to surround a specimen to be examined, cooling means for cooling said wall means, a specimen holder carried by said housing and extending through said wall means into said inner chamber, means thermally insulating said specimen holder from said wall means, means defining a plurality of apertures in said wall means, an ion etching device carried by said housing and directing an ion beam through one of said apertures to the specimen in said inner chamber, a discharging device carried by said housing in alignment with another of said apertures for an electron discharge beam from said inner chamber, a coating device carried by said housing and directing a molecular beam through another of said apertures to the specimen in said inner chamber, and second pump means operatively connected to said inner chamber for evactuating the same separately from said first mentioned pump means.

5. The combination as recited in claim 4 wherein said coating device includes a plurality of substance carriers which contain substances to be evaporated and means for selectively positioning said substance carriers in relation to the specimen.

6. The combination as recited to claim 4 wherein said wall means comprises an air lock for said specimen holder whereby the specimen may be removed from said inner chamber without affecting the vacuums in said diffraction chamber and in said inner chamber.

7. The combination as recited in claim 4 wherein an optical observation device is combined with said ion etching device, a pivoting mechanism for said optical observation device and said ion etching device for alternately positioning the same in front of the specimen.

References Cited by the Examiner

UNITED STATES PATENTS

| 2,606,292 | 8/52 | Columbe | 250—49.5 |
| 2,745,966 | 5/56 | Verhoeff | 250—49.5 |
| 2,793,282 | 5/57 | Steigerwald | 250—49.5 |
| 2,826,701 | 3/58 | Columbe | 250—49.5 |
| 2,899,556 | 8/59 | Schopper et al. | 250—49.5 |
| 2,944,172 | 7/60 | Opitz et al. | 250—49.5 |
| 2,968,723 | 1/61 | Steigerwald | 250—49.5 |

RALPH G. NILSON, *Primary Examiner.*

ARCHIE R. BORCHELT, *Examiner.*